United States Patent [19]

Mautner

[11] Patent Number: 5,621,034
[45] Date of Patent: Apr. 15, 1997

[54] STABILIZATION OF REACTIVE ORGANOPOLYSILOXANE RESINS

[75] Inventor: Konrad Mautner, Kastl, Germany

[73] Assignee: Wacker-Chemie GmbH, Munich, Germany

[21] Appl. No.: 608,830

[22] Filed: Feb. 29, 1996

[30] Foreign Application Priority Data

Apr. 27, 1995 [DE] Germany ............ 195 15 540.8

[51] Int. Cl.$^6$ ................................... C08K 5/09
[52] U.S. Cl. ............ 524/321; 524/284; 524/294; 524/296; 524/298; 528/12
[58] Field of Search ............ 528/12; 524/284, 524/294, 296, 298, 321

[56] References Cited

U.S. PATENT DOCUMENTS

| | | |
|---|---|---|
| 3,350,309 | 10/1967 | Buehler . |
| 3,839,280 | 10/1974 | Zdaniewski . |
| 4,448,919 | 5/1984 | Murase .................. 524/394 |
| 4,455,403 | 6/1984 | Liebler . |
| 4,515,932 | 5/1985 | Chung . |
| 4,636,324 | 1/1987 | Murase et al. .............. 252/70 |
| 4,900,778 | 2/1990 | Nagashima . |

FOREIGN PATENT DOCUMENTS

| | | |
|---|---|---|
| 0526975 | 2/1993 | European Pat. Off. . |
| 0616001 | 9/1994 | European Pat. Off. . |
| 2147296 | 3/1973 | France . |
| 2596056 | 9/1987 | France . |
| 3904973 | 12/1989 | Germany . |
| 2219300 | 12/1989 | United Kingdom . |

OTHER PUBLICATIONS

W. Noll, Chemistry and Technology for Silicones, Academic Press Inc., Orlando Florida, 1968, p. 413.

*Primary Examiner*—Melvyn I. Marquis
*Attorney, Agent, or Firm*—Martin Connaughton

[57] ABSTRACT

The invention relates to storage-stable compositions comprising
(A) organopolysiloxane resin having hydroxyl and/or alkoxy groups bonded to silicon atoms, and
(B) stabilizers selected from among
(B1) aliphatic polycarboxylic acids having at least 2 carboxyl groups and
(B2) carboxylic anhydrides of aliphatic polycarboxylic acids having at least 2 carboxyl groups.

7 Claims, No Drawings

STABILIZATION OF REACTIVE ORGANOPOLYSILOXANE RESINS

FIELD OF THE INVENTION

The present invention relates to storage-stable compositions comprising (A) organopolysiloxane resin having hydroxyl and/or alkoxy groups bonded to silicon atoms, and (B) stabilizers, and a process for stabilizing organopolysiloxane resin (A).

Organopolysiloxane resins having hydroxyl and/or alkoxy groups bonded to silicon atoms are prepared by hydrolysis of alkoxysilanes and/or their partial condensation products in an aqueous, acid medium. These resins are reactive and condense during work-up or storage in bulk, as solution or emulsion.

BACKGROUND OF THE INVENTION

U.S. Pat. No. 4,455,403 describes the preparation of coating compositions based on silicone resin as aqueous alcoholic solutions by hydrolysis of alkylalkoxysilanes in the presence of acids. The coating compositions gain storage stability by means of higher alkanemonocarboxylic acids.

W. Noll, Chemistry and Technology of Silicones, Academic Press, Inc., Orlando, Fla., 1968, page 413 cites alcohols, cerium salts, cyclohexanone and chelating agents as stabilizers for silicone resins against the condensation of silanol groups.

However, the known additives for stabilizing organopolysiloxane resins having hydroxyl and/or alkoxy groups bonded to silicon atoms are not very effective. For example, resins prepared by hydrolysis of methyltrimethoxysilane gel during isolation of the resins after hydrolysis even if chelating agents such as acetylacetone are added.

SUMMARY OF THE INVENTION

It is an object of the present invention to provide storage-stable organopolysiloxane resin compositions in which the organopolysiloxane resin has hydroxyl and/or alkoxy groups bonded to silicon atoms.

The present invention provides storage-stable compositions comprising (A) organopolysiloxane resin having hydroxyl and/or alkoxy groups bonded to silicon atoms, and (B) stabilizers selected from among
 (B1) aliphatic polycarboxylic acids having at least 2 carboxyl groups and
 (B2) carboxylic anhydrides of aliphatic polycarboxylic acids having at least 2 carboxyl groups.

The organopolysiloxane resin (A) is preferably made up of units of the formula

  (1), where

R are identical or different, unsubstituted or halogen-substituted $C_1$–$C_{18}$-hydrocarbon radicals, R' are identical or different $C_1$–$C_4$-alkyl radicals or hydrogen atoms, a has an average value of from 0.5 to 1.9, b has an average value of from 0.05 to 0.8 and the sum of a+b has a maximum value of 1.9.

Examples of unsubstituted radicals R are alkyl radicals such as the methyl, ethyl, n-propyl, iso-propyl, n-butyl, iso-butyl, sec-butyl, tert-butyl, n-pentyl, iso-pentyl, neo-pentyl, tert-pentyl radical, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl, naphthyl, anthryl and phenanthryl radical; alkaryl radicals such as o-, m-, p-tolyl radicals, xylyl radicals and ethylphenyl radicals; aralkyl radicals such as the benzyl radical, the α- and the β-phenylethyl radical.

Examples of halogen-substituted radicals R are substituted by fluorine and chlorine such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radical.

Preferred radicals R are unsubstituted hydrocarbon radicals, in particular those having from 1 to 8 carbon atoms, specifically methyl, ethyl, vinyl, tolyl and phenyl radicals.

Examples of radicals R' are hydrogen atoms, methyl, ethyl, n-propyl, iso-propyl, n-butyl, sec-butyl, iso-butyl and tert-butyl radicals, in particular methyl and ethyl radicals.

The index a has an average value of from 0.8 to 1.7, in particular from 1.0 to 1.5.

The index b has an average value of from 0.1 to 0.5, in particular from 0.2 to 0.4.

The sum of a+b has a value of from 1.0 to 1.7.

The organopolysiloxane resin (A) has the formula

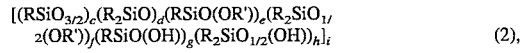  (2), where c has a value of from 0.77 to 0.96, d has a value of from 0 to 0.22, the sum of e+f has a value of from 0.02 to 0.08, the sum of g+h has a value of from 0.02 to 0.05, and i has a value of from 5 to 1000, in particular from 10 to 150, and R and R' are as defined above.

The stabilizers (B) comprise a saturated or olefinically unsaturated aliphatic hydrocarbon which can contain carbonyl groups, hydroxyl groups, fluorine atoms or chlorine atoms in addition to the carboxyl or carboxylic anhydride groups.

The stabilizers (B) have from 3 to 15, from 3 to 8, carbon atoms and from 2 to 4 carboxyl groups which can be intramolecularly condensed to form carboxylic anhydride groups.

Preferred examples of the aliphatic polycarboxylic acids (B1) are malonic, succinic, glutaric, adipic, pimelic, suberic, maleic, fumaric, tartronic, roesoxalic, racetalc tartaric, malic, chloropropionic, chlorosuccinic, tartaric, acetonedicarboxylic and citric acid.

Preferred examples of the aliphatic carboxylic anhydrides from aliphatic polycarboxylic acids (B2) are malonic, maleic succinic, glutaric and adipic anhydride.

Based on 100 parts by weight of organopolysiloxane resin (A), the storage-stable compositions contain at least 0.01, preferably 0.05, part by weight and more preferably at most 1, and 0.2, part by weight of stabilizers (B).

The storage-stable compositions can contain organic solvents, or be present as an emulsion or in bulk without organic solvent or water.

If organic solvents are used, solvents or solvent mixtures having a boiling point or boiling range of up to 120° C. at 0.1 MPa are preferred. Examples of such solvents are alcohols such as methanol, ethanol, n-propanol, iso-propanol, n-amyl alcohol, iso-amyl alcohol; ethers such as dioxane, tetrahydrofuran, diethyl ether, diisopropyl ether, diethylene glycol dimethyl ether; chlorinated hydrocarbons such as dichloromethane, trichloromethane, tetrachloromethane, 1,2-dichloroethane, trichloroethylene; hydrocarbons such as pentane, n-hexane, hexane isomer mixtures, heptane, octane, naphtha, petroleum ether, benzene, toluene, xylenes; ketones such as acetone, methyl ethyl ketone, diisopropyl ketone, methyl isobutyl ketone (MIBK); esters such as butyl acetate, propyl propionate, ethyl butyrate, ethyl isobutyrate; carbon disulfide and nitrobenzene or mixtures of these solvents.

The term solvent does not mean that all components have to dissolve in it.

The aqueous emulsions contain known emulsifiers.

Suitable anionic emulsifiers are, for example:

1. Alkyl sulfates, particularly those having a chain length of from 8 to 18 carbon atoms, alkyl and alkaryl ether sulfates having from 8 to 18 carbon atoms in the hydrophobic radical and from 1 to 40 ethylene oxide (EO) or propylene oxide (PO) units.
2. Sulfonates, particularly alkylsulfonates having from 8 to 18 carbon atoms, alkylarylsulfonates having from 8 to 18 carbon atoms, taurides, esters and monoesters of sulfosuccinic acid with monohydric alcohols or alkylphenols having from 4 to 15 carbon atoms; if desired, these alcohols or alkylphenols can also be ethoxylated with from 1 to 40 EO units.
3. Alkali metal and ammonium salts of carboxylic acids having from 8 to 20 carbon atoms in the alkyl, aryl, alkaryl or aralkyl radical.
4. Phosphoric acid partial esters and their alkali metal and ammonium salts, particularly alkyl and alkaryl phosphates having from 8 to 20 carbon atoms in the organic radical, alkyl or alkaryl ether phosphates having from 8 to 20 carbon atoms in the alkyl or alkaryl radical and from 1 to 40 EO units. Suitable nonionic emulsifiers are, for example:
5. Polyvinyl alcohol having from 5 to 50%, preferably from 8 to 20%, of vinyl acetate units and having a degree of polymerization of from 500 to 3000.
6. Alkyl polyglycol ethers, preferably those having from 8 to 40 EO units and alkyl radicals of from 8 to 20 carbon atoms.
7. Alkyl aryl polyglycol ethers, preferably those having from 8 to 40 EO units and from 8 to 20 carbon atoms in the alkyl and aryl radicals.
8. Ethylene oxide/propylene oxide (EO/PO) block copolymers, preferably those having from 8 to 40 EO or PO units.
9. Fatty acids having from 6 to 24 carbon atoms.
10. Natural materials and their derivatives, such as lecithin, lanolin, saponins, celluloses; cellulose alkyl ethers and carboxyalkylcelluloses whose alkyl groups each have up to 4 carbon atoms.
11. Linear organo(poly) siloxanes containing polar groups, in particular those containing alkoxy groups having up to 24 carbon atoms and/or up to 40 EO and/or PO groups.

Suitable cationic emulsifiers are, for example:

12. Salts of primary, secondary and tertiary fatty amines having from 8 to 24 carbon atoms with acetic acid, sulfuric acid, hydrochloric acid and phosphoric acids.
13. Quaternary alkylammonium and alkylbenzeneammonium salts, in particular those whose alkyl group has from 6 to 24 carbon atoms, in particular the halides, sulfates, phosphates and acetates.
14. Alkylpyridinium, alkylimidazolinium and alkyloxazolinium salts, in particular those whose alkyl chain has up to 18 carbon atoms, especially the halides, sulfates, phosphates and acetates.

Suitable ampholytic emulsifiers are, for example:

15. Long-chain-substituted amino acids, such as N-alkyldi(aminoethyl)glycine or N-alkyl-2-amino-propionic acid salts.
16. Betaines, such as N-(3-acylamidopropyl)-N,N-dimethylammonium salts having a $C_8$–$C_{18}$-acyl radical and alkylimidazolium betaines.

Preference is given to nonionic and ampholytic emulsifiers.

The present invention also provides a process for stabilizing organopolysiloxane resin (A), which comprises admixing the organopolysiloxane resin (A) with the stabilizers (B).

The stabilizers (B) are added as such or as a solution in the above solvents to the organopolysiloxane resin (A).

The organopolysiloxane resin (A) is prepared by hydrolysis of alkoxysilanes and/or their partial condensation products in an aqueous, acid medium.

The organopolysiloxane resin (A) is preferably prepared using silanes of the formula

$$R_k Si(OR')_{(4-k)} \qquad (3),$$

where

R and R' are as defined above and k has the values 0, 1, 2, 3 or 4, preferably 1 and 2, on average from 0.5 to 1.9, preferably from 0.8 to 1.7, in particular from 1.0 to 1.5.

Preference is given to using a mixture of silanes of the formula (3) comprising from 20 to 100, in particular from 80 to 100, parts by weight of silane in which k has the value 1 and from 80 to 100, in particular from 0 to 80, parts by weight of silane in which k has the value 2. In addition, from 0 to 10 parts by weight of silane in which k has the value 0 and from 0 to 10 parts by weight of silane in which k has the value 3 can be present.

Preference is given to using methyltriethoxysilane and dimethyldiethoxysilane, with the silanes also being able to be used in unpurified form, as they are obtained in their preparation from the corresponding methylchlorosilanes in water-containing, azeotropic ethanol.

In the hydrolysis of alkoxysilanes and/or their partial condensation products to form the organopolysiloxane resin (A) in an aqueous, acid medium, the acid required can come from the hydrochloric acid formed.

Preferably, acid is added. Examples of Brönstedt acids which can be used in the process are mineral, carboxylic and sulfonic acids. Preference is given to strong acids such as boric, tetrafluoroboric, nitric, nitrous, phosphoric, phosphorous, hypophosphorous, sulfuric, sulfurous, peroxosulfuric, hydrochloric, hydrofluoric, hydrobromic, perchloric, hexafluorophosphoric, benzenesulfonic, p-toluenesulfonic, methanesulfonic, trifluoromethanesulfonic acid and carboxylic acids such as chloroacetic, trichloroacetic, acetic, acrylic, benzoic, trifluoroacetic, citric, crotonic, formic, fumaric, maleic, malonic, gallic, itaconic, lactic, tartaric, oxalic, phthalic and succinic acid.

The stabilizers (B1) can also be used as acid in the preparation of the organopolysiloxane resin (A).

The acids are used in dilute aqueous solution. The acid concentration of the aqueous acid is at most 5% by weight, preferably from 0.05 to 2% by weight. Preference is given to the use of hydrochloric acid having a strength of from 0.1 to 1% by weight. The acid concentrations indicated lead to reactive resins which are rich in hydroxy and alkoxy groups and are therefore curable without addition of catalyst. Higher acid concentrations lead to resins which are low in hydroxy and alkoxy groups and therefore have little reactivity and can be isolated without addition of stabilizer (B). These resins are curable only with addition of catalyst.

The water required for the hydrolysis of the alkoxysilanes and/or their partial condensation products preferably comes from the aqueous acid in an amount which is from 1.5 to 10 times, in particular from 2 to 4 times, the molar amount theoretically required for the hydrolysis.

The hydrolysis is carried out at temperatures of at least 60° C., preferably at most 150° C. and at the boiling point of the alcohol formed. For the hydrolysis, alkoxysilanes and/or their partial condensation products are charged first and the aqueous acid is metered with the energy of the spontaneous hydrolysis reaction being sufficient to reach the reaction temperatures required. However, the alkoxysilanes and/or their partial condensation products can also be heated to approximately the reaction temperature prior to commencement of hydrolysis.

The hydrolysis is carried out at a pressure of from 0.1 to 0.5 MPa, preferably at ambient pressure.

After the hydrolysis, the alcohol formed is separated off. This is carried out by distillation, with up to 99% of the alcohol formed being distilled off, or by addition of excess water, or an amount of water which leads to the formation of a second, aqueous-alcoholic phase. The addition of excess water is preferred, since the residual acid from the acid hydrolysis can be easily removed. To improve the phase separation, a polar solvent water-immiscible such as one of the above-mentioned water-insoluble solvents, is used. Preference is given to alcohols such as n-amyl alcohol, i-amyl alcohol; ketones such as methyl ethyl ketone, diisopropyl ketone, methyl isobutyl ketone (MIBK); esters such as butyl acetate, propyl propionate, ethyl butyrate, ethyl isobutyrate. Particular preference is given to the amyl alcohols and MIBK.

After phase separation, the aqueous phase is separated off. The resin solution obtained can be admixed with stabilizer (B) to give a storage-stable composition.

The solvent can be removed by evaporation at from 0.0001 to 0.01 MPa, preferably at from 130° to 180° C. A thin-film evaporator or a short-path distillation apparatus can be used for this purpose. The stabilizer (B) has to be present during removal of the solvent or beforehand, otherwise the organopolysiloxane resin (A) gels. This gives a storage-stable composition which cures on heating without catalyst.

In the following examples, unless otherwise indicated,
a) all quantities are by weight;
b) all pressures are 0.10 MPa (abs.);
c) all temperatures are 20° C.

EXAMPLES

Examples 1 to 11

260 g of water and 3.7 g of 36% strength hydro chloric acid were added to 1069 g of methyltri methoxysilane over a period of 5 minutes while stirring. The temperature rose from 19° C. to reflux temperature (78° C.), at which the mixture was held for a further 30 minutes. Subsequently, 1000 ml of methyl isobutyl ketone (MIBK) and 2000 ml of water were added. After phase separation, the organic phase was separated off and worked up under various conditions which are shown in Tables 1 and 2:

Notes on the tables:
*=not according to the present invention

Filtration aid a=0.5% by weight of sodium aluminum silicate

Filtration aid b=polypropylene membrane filter disk

Filtration aid c=filter plate Seitz Supra$^R$ from Seitz-Filterwerke, Bad Kreuznach Filtration aid d=0.5% by weight of activated carbon+0.2% by weight of sodium aluminum silicate

TABLE 1

|  | Ex. 1* | Ex. 2* | Ex. 3* | Ex. 4* | Ex. 5 | Ex. 6 |
|---|---|---|---|---|---|---|
| Filtration | None | a | b | c | d | d |
| Addition of succinic acid [% by weight] | — | — | — | — | 0.1 | 0.05 |
| Viscosity 50% in MIBK [mPa · s] | 10.1 | Gels during the distillation | | | 14.6 | 14.3 |
| Gelling time [min] | 26 | | | | 13 | 5.3 |
| Viscosity after 2 months [mPa · s] | Gels | | | | 14.7 | |
| Viscosity after 6 months [mPa · s] | | | | | 30.7 | 17 |

TABLE 2

|  | Ex. 7 | Ex. 8 | Ex. 9 | Ex. 10 | Ex. 11* |
|---|---|---|---|---|---|
| Filtration | d | d | d | d | d |
| Addition of 0.1% by weight of | Maleic anhydride | Succinic anhydride | Citric acid | Fumaric acid | Acetyl-acetone |
| Viscosity 50% in MIBK [mPa · s] | 10.8 | 21.1 | 12.7 | 22.3 | Gels during the distillation |
| Gelling time [min] | 15 | 5 | 10 | 4 | |

Example 12

The procedure used was as in Examples 1–11, but a silane mixture of 17.2 g of dimethyldiethoxysilane and 1052 g of methyltriethoxysilane was used. After filtration through 0.5% by weight of activated carbon and 0.2% by weight of sodium aluminum silicate, 0.1% by weight of succinic acid was added. The viscosity of the 50% strength resin solution in MIBK was 14 mPa.s, the gelling time was 8 min. After 6 months, the viscosity of the 50% strength resin solution in MIBK was 17.5 mPa.s, the gelling time was 9 min.

What is claimed is:

1. A storage-stable composition consisting essentially of;
   (A) an organopolysiloxane resin having hydroxyl and/or alkoxy groups bonded to silicon atoms, and
   (B) a stabilizer selected from the group consisting of:
      (B1) aliphatic polycarboxylic acids having at least 2 carboxyl groups selected from the group consisting of malonic, succinic, glutaric, adipic, pimelic, suberic, fumaric, tartronic, mesoxalic, racemic tartaric, tartaric, malic, chlorosuccinic, citric and acetonedicarboxylic acid and
      (B2) carboxylic anhydrides of (B1) aliphatic polycarboxylic acids having at least 2 carboxyl groups.

2. A storage-stable composition as claimed in claim 1, wherein the organopolysiloxane resin (A) is made up of units of the formula

$$R_a(OR')_b SiO_{(4-a-b)/2} \quad (1),$$

where
R are identical or different, unsubstituted or halogen-substituted $C_1$–$C_{18}$-hydrocarbon radicals, R' are identical or different $C_1$–$C_4$-alkyl radicals or hydrogen atoms, a has an average value of from 0.5 to 1.9, b has an average value of from 0.05 to 0.8 and the sum of a+b has a maximum value of 1.9.

3. A storage-stable composition as claimed in claim 1, wherein the stabilizer (B) has from 3 to 15 carbon atoms and from 2 to 4 carboxyl groups.

4. A storage-stable composition as claimed in claim 1, containing at least 0.01 and at most 1 part by weight of stabilizer (B) per 100 parts by weight of organopolysiloxane resin (A).

5. A storage-stable composition as claimed in claim 1, further containing organic solvents.

6. A process for stabilizing organopolysiloxane resin (A) as claimed in claim 1, which comprises admixing the organopolysiloxane resin (A) with the stabilizer (B) as claimed in claim 1.

7. A storage-stable composition as claimed in claim 3, wherein the carboxyl groups are condensed to form carboxylic anhydride groups.

* * * * *